United States Patent
Mooney

(10) Patent No.: US 7,917,389 B2
(45) Date of Patent: *Mar. 29, 2011

(54) RELEVANT EMAIL ADS FOR DOMAIN NAME ADVERTISER

(75) Inventor: Luke Mooney, Scottsdale, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 1389 days.

This patent is subject to a terminal disclaimer.

(21) Appl. No.: 10/907,811

(22) Filed: Apr. 15, 2005

(65) Prior Publication Data

US 2005/0165896 A1    Jul. 28, 2005

(51) Int. Cl.
*G06Q 30/00*    (2006.01)

(52) U.S. Cl. .................. 705/14.4; 709/206; 709/219

(58) Field of Classification Search ................ 709/245, 709/206, 223, 229, 220, 226, 219; 707/3, 707/102; 705/14, 14.4
See application file for complete search history.

(56) References Cited

U.S. PATENT DOCUMENTS

| | | | |
|---|---|---|---|
| 4,850,007 A | 7/1989 | Marino et al. |
| 5,105,184 A | 4/1992 | Pirani et al. |
| 5,305,195 A | 4/1994 | Murphy |
| 5,515,270 A | 5/1996 | Weinblatt |
| 5,600,366 A | 2/1997 | Schulman |
| 5,724,521 A | 3/1998 | Dedrick |
| 5,740,549 A | 4/1998 | Reilly et al. |
| 5,781,894 A | 7/1998 | Petrecca et al. |
| 5,793,972 A | 8/1998 | Shane |
| 5,809,242 A | 9/1998 | Shaw et al. |
| 5,838,790 A | 11/1998 | McAuliffe et al. |
| 5,857,175 A | 1/1999 | Day et al. |
| 5,870,724 A | 2/1999 | Lawlor et al. |
| 5,918,014 A | 6/1999 | Robinson |
| 5,937,037 A | 8/1999 | Kamel et al. |
| 5,948,061 A | 9/1999 | Merriman et al. |
| 6,002,393 A | 12/1999 | Hite et al. |
| 6,009,150 A | 12/1999 | Kamel |
| 6,009,409 A | 12/1999 | Adler et al. |
| 6,009,410 A | 12/1999 | LeMole et al. |
| 6,014,502 A | 1/2000 | Moraes |
| 6,026,368 A | 2/2000 | Brown et al. |
| 6,026,369 A | 2/2000 | Capek |
| 6,058,435 A | 5/2000 | Sassin et al. |
| 6,064,967 A | 5/2000 | Speicher |
| 6,067,570 A | 5/2000 | Kreynin et al. |
| 6,085,229 A | 7/2000 | Newman et al. |
| 6,119,098 A | 9/2000 | Guyot et al. |
| 6,134,532 A | 10/2000 | Lazarus et al. |
| 6,141,010 A | 10/2000 | Hoyle |
| 6,188,398 B1 | 2/2001 | Collins-Rector et al. |

(Continued)

*Primary Examiner* — John G Weiss
*Assistant Examiner* — M Hamilton
(74) *Attorney, Agent, or Firm* — Sergey G. Zaytsev

(57) ABSTRACT

Systems and methods of the present invention allow for providing suggested domain names in connection to email messages. An email message is sent from a sender to a recipient. A domain name module generates suggested domain names based on the properties of the email message (e.g. content and headers) and/or based on the properties of a network connection utilized to view the email message (e.g. user's geographical location). Suggested domain names are embedded into the email message or displayed in proximity to the email message. A user viewing the email message may notice an appealing domain name among the suggested domain names. Then the user may register, purchase, or backorder it. The invention may be used as a marketing technique for registration, sale, or resale of the domain names.

7 Claims, 8 Drawing Sheets

U.S. PATENT DOCUMENTS

| | | | |
|---|---|---|---|
| 6,199,106 B1 | 3/2001 | Shaw et al. | |
| 6,205,432 B1 | 3/2001 | Gabbard et al. | |
| 6,212,554 B1 | 4/2001 | Roskowski | |
| 6,216,129 B1 | 4/2001 | Eldering | |
| 6,285,987 B1 | 9/2001 | Roth et al. | |
| 6,298,341 B1 | 10/2001 | Mann et al. | |
| 6,314,451 B1 | 11/2001 | Landsman et al. | |
| 6,317,761 B1 | 11/2001 | Landsman et al. | |
| 6,332,158 B1 * | 12/2001 | Risley et al. | 709/219 |
| 6,338,082 B1 | 1/2002 | Schneider | 709/203 |
| 6,351,745 B1 | 2/2002 | Itakura et al. | |
| 6,370,578 B2 | 4/2002 | Revashetti et al. | |
| 6,377,936 B1 | 4/2002 | Henrick et al. | |
| 6,379,251 B1 | 4/2002 | Auxier et al. | |
| 6,385,592 B1 | 5/2002 | Angles et al. | |
| 6,442,529 B1 | 8/2002 | Krishan et al. | |
| 6,442,549 B1 | 8/2002 | Schneider | 707/10 |
| 6,453,347 B1 | 9/2002 | Revashetti et al. | |
| 6,457,025 B2 | 9/2002 | Judson | |
| 6,463,585 B1 | 10/2002 | Hendricks et al. | |
| 6,470,079 B1 | 10/2002 | Benson | |
| 6,484,148 B1 | 11/2002 | Boyd | |
| 6,487,538 B1 | 11/2002 | Gupta et al. | |
| 6,487,721 B1 | 11/2002 | Safadi | |
| 6,496,857 B1 | 12/2002 | Dustin et al. | |
| 6,505,169 B1 | 1/2003 | Bhagavath et al. | |
| 6,513,052 B1 | 1/2003 | Binder | |
| 6,516,338 B1 | 2/2003 | Landsman et al. | |
| 6,519,589 B2 * | 2/2003 | Mann et al. | 707/3 |
| 6,601,041 B1 | 7/2003 | Brown et al. | |
| 6,606,652 B1 | 8/2003 | Cohn et al. | |
| 6,622,174 B1 | 9/2003 | Ukita et al. | |
| 6,633,850 B1 | 10/2003 | Gabbard et al. | |
| 6,647,257 B2 | 11/2003 | Owensby | |
| 6,684,249 B1 | 1/2004 | Frerichs et al. | |
| 6,714,934 B1 | 3/2004 | Fordham | |
| 6,757,661 B1 | 6/2004 | Blaser et al. | |
| 6,757,662 B1 | 6/2004 | Greenwald et al. | |
| 6,820,277 B1 | 11/2004 | Eldering et al. | |
| 6,873,424 B2 | 3/2005 | Jakobsson et al. | |
| 6,874,018 B2 | 3/2005 | Wu | |
| 6,880,123 B1 | 4/2005 | Landsman et al. | |
| 6,892,181 B1 | 5/2005 | Megiddo et al. | |
| 6,892,354 B1 | 5/2005 | Servan-Schreiber et al. | |
| 6,898,571 B1 | 5/2005 | Val et al. | |
| 6,901,436 B1 | 5/2005 | Schneider | 709/219 |
| 6,925,441 B1 | 8/2005 | Jones, III et al. | |
| 6,928,615 B1 | 8/2005 | Haitsuka et al. | |
| 6,973,505 B1 * | 12/2005 | Schneider | 709/245 |
| 7,158,986 B1 * | 1/2007 | Oliver et al. | 1/1 |
| 7,188,138 B1 * | 3/2007 | Schneider | 709/203 |
| 7,281,042 B2 | 10/2007 | Hsu et al. | |
| 7,305,394 B2 * | 12/2007 | Fellman | 1/1 |
| 2002/0052787 A1 | 5/2002 | Matsumoto et al. | |
| 2002/0077130 A1 | 6/2002 | Owensby | |
| 2002/0091703 A1 | 7/2002 | Bayles | 707/101 |
| 2002/0091827 A1 | 7/2002 | King et al. | 709/226 |
| 2002/0126304 A1 | 9/2002 | Jakobsson et al. | |
| 2003/0050863 A1 | 3/2003 | Radwin | |
| 2003/0191689 A1 * | 10/2003 | Bosarge et al. | 705/14 |
| 2004/0015397 A1 | 1/2004 | Barry et al. | |
| 2004/0019523 A1 | 1/2004 | Barry et al. | |
| 2004/0044571 A1 | 3/2004 | Bronnimann et al. | |
| 2004/0059708 A1 | 3/2004 | Dean et al. | |
| 2004/0059712 A1 * | 3/2004 | Dean et al. | 707/1 |
| 2004/0093327 A1 | 5/2004 | Anderson et al. | |
| 2004/0167928 A1 | 8/2004 | Anderson et al. | |
| 2004/0247092 A1 | 12/2004 | Timmins et al. | |
| 2004/0249709 A1 | 12/2004 | Donovan et al. | |
| 2004/0267725 A1 | 12/2004 | Harik | |
| 2005/0021397 A1 | 1/2005 | Cui et al. | |
| 2005/0065806 A1 | 3/2005 | Harik | |
| 2005/0071224 A1 | 3/2005 | Fikes et al. | |
| 2005/0071325 A1 | 3/2005 | Bem | |
| 2005/0096979 A1 | 5/2005 | Koningstein | |
| 2005/0131758 A1 | 6/2005 | Desikan et al. | |
| 2005/0144069 A1 | 6/2005 | Wiseman et al. | |
| 2005/0144073 A1 | 6/2005 | Morrisroe et al. | |
| 2005/0216335 A1 | 9/2005 | Fikes et al. | |
| 2005/0222900 A1 | 10/2005 | Fuloria et al. | |
| 2005/0222903 A1 | 10/2005 | Buchheit et al. | |
| 2005/0222989 A1 | 10/2005 | Haveliwala et al. | |
| 2005/0251443 A1 | 11/2005 | Chan et al. | |
| 2005/0251444 A1 | 11/2005 | Varian et al. | |
| 2007/0271393 A1 * | 11/2007 | Wong | 709/245 |

* cited by examiner

List of current Generic Top-Level Domains

| gTLD | Description |
|---|---|
| .aero | Reserved for members of the air-transport industry and is sponsored by Société Internationale de Télécommunications Aéronautiques (SITA). |
| .biz | Restricted to businesses and is operated by NeuLevel, Inc. |
| .com | Operated by VeriSign Global Registry Services. |
| .coop | Reserved for cooperative associations and is sponsored by Dot Cooperation LLC. |
| .edu | Reserved for postsecondary institutions accredited by an agency on the U.S. Department of Education's list of Nationally Recognized Accrediting Agencies and is registered only through Educause. |
| .gov | Reserved exclusively for the United States Government. It is operated by the US General Services Administration. |
| .info | Operated by Afilias Limited. |
| .int | Used only for registering organizations established by international treaties between governments. It is operated by the IANA .int Domain Registry. |
| .mil | Reserved exclusively for the United States Military. It is operated by the US DoD Network Information Center. |
| .museum | Reserved for museums and is sponsored by the Museum Domain Management Association. |
| .name | Reserved for individuals and is operated by Global Name Registry. |
| .net | Operated by VeriSign Global Registry Services. |
| .org | Operated by Public Interest Registry. It is intended to serve the noncommercial community, but all are eligible to register within .org. |
| .pro | Being established; it will be restricted to credentialed professionals and related entities and is operated by RegistryPro. |

FIG. 1 (Prior Art)

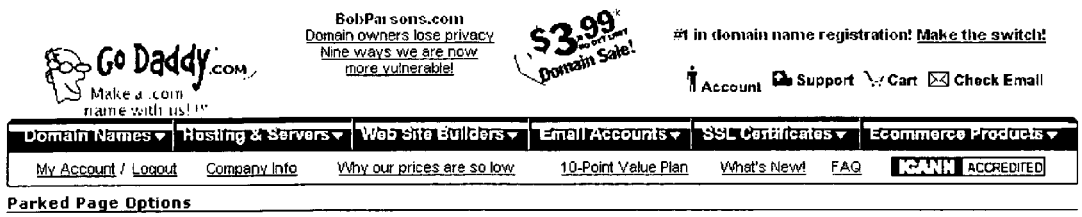

Three web page options with every domain - free!

When you register a domain name with GoDaddy.com, you get a Coming Soon page automatically. (It'll be live on the Internet in about 48 hours of your purchase.) If you'd prefer either the For Sale page or the Starter Web page, just log in at My Account, select the listing from the Web Site dropdown menu, and click the Set Up button. It's easy! See more Web site options here.

| Coming Soon Page | Domain For Sale Page | Starter Web Page |
|---|---|---|
| 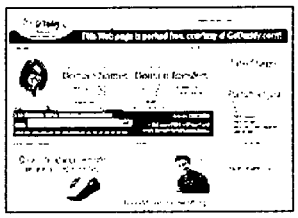 | 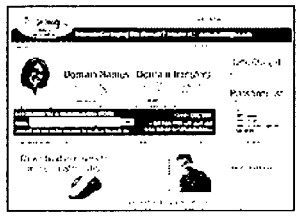 | 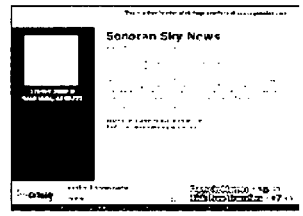 |
| • This attractive, colorful page tells visitors your site is coming soon.<br>• Visitors see this page when they type in your new domain name (unless you choose a For Sale or Starter Web page instead).<br>• Use this page for as long as you like.<br>• You cannot modify this page. | • Expose your domain for sale to potential millions!<br>• The eye-catching page header tells buyers that your domain is for sale.<br>• Include your email address so buyers can contact you. | • Enjoy an online "brochure" for you, your group, organization or small business.<br>• Choose a favorite template and color combination.<br>• Customize the page with your own header, text, graphics and links to your favorite sites.<br>• Update your Starter page any time, and as often as you like. |

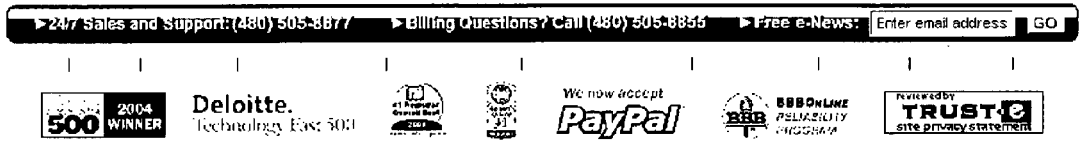

Copyright © 1999 - 2005 Go Daddy Software, Inc. All rights reserved. GoDaddy.com ranked #1 among all registrars in net new domain name registrations for the years 2002, 2003, and 2004. Source: Name Intelligence, Inc. DBA Whois Source.

FIG. 2 (Prior Art)

RELEVANT EMAIL ADS FOR DOMAIN NAME ADVERTISER

CROSS REFERENCE TO RELATED PATENT APPLICATIONS

This patent application is related to the following patent applications concurrently filed herewith, all assigned to The Go Daddy Group, Inc:

U.S. patent application Ser. No. 10/907,809, "PARKED WEBPAGE DOMAIN NAME SUGGESTIONS."

U.S. patent application Ser. No. 10/907,810, "RELEVANT ONLINE ADS FOR DOMAIN NAME ADVERTISER."

FIELD OF THE INVENTION

The present invention relates in general to email advertisement and in particular to customization of email ads for a domain name registrar.

BACKGROUND OF THE INVENTION

The Internet is a worldwide network of computers and computer networks arranged to allow the easy and robust exchange of information between users of computers. Hundreds of millions of people around the world have access to computers connected to the Internet via Internet Service Providers (ISPs). Content providers place multimedia information, i.e. text, graphics, sounds, and other forms of data, at specific locations on the Internet referred to as websites. The combination of all the websites and their corresponding webpages on the Internet is generally known as the World Wide Web (WWW) or simply web.

Websites may be created using HyperText Markup Language (HTML). The HTML tags define how the webpages for the website are to be displayed. Users of the Internet may access content providers' websites using software known as a Web browser, such as MICROSOFT INTERNET EXPLORER or NETSCAPE NAVIGATOR. After the browser has located the desired webpage, it requests and receives information from the webpage, typically in the form of an HTML document, and then displays the webpage content for the user. The user may then view other webpages at the same website or move to an entirely different website using the browser.

Browsers are able to locate specific websites because each website, resource and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other, e.g. 64.202.167.32. The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon, for example 2EDC:BA98:0332:0000:CF8A:000C:2154:7313.

However, IP addresses, even in a human readable notation, are difficult to remember and use by people. Uniform Resource Locators (URL) are much easier to remember and may be used to point to any website, directory or file on the Internet. A browser is able to access a website on the Internet through the use of a URL. The URL may include a Hypertext Transfer Protocol (HTTP) request combined with the website's Internet address, also known as the website's domain name. An example of a URL with an HTTP request and domain name is: http://godaddy.com. In this example, the "http" identifies the URL as an HTTP request and the "godaddy.com" is the domain name.

Individuals, companies, and other entities that provide content on the web generally want to use their name or one of their trademarks as part of their domain name. Thus, domain names are generally company trademarks, personal names or short phrases concatenated with a top level domain name (TLD) extension (e.g. .com, .net, org, .biz, .us, .cc, .ws, .de, etc.). TLD extensions can be divided into two groups. The first group is known as generic Top-Level Domains (gTLD) and the second group is country code TLDs (ccTLD). The list of current gTLDs is shown on FIG. 1. Examples of current ccTLDs are: .us for the United States, .uk and .gb for United Kingdom, .ca for Canada, .de for Germany, .jp for Japan, etc.

Domain names are much easier to remember and use than their corresponding IP addresses. The Internet Corporation for Assigned Names and Numbers (ICANN) approves some gTLDs and delegates the responsibility to a particular organization (hereinafter registry) for maintaining an authoritative source for the registered domain names within a TLD and their corresponding IP addresses. For certain TLDs, e.g. .biz, .info, .name, and now .org, the registry is also the authoritative source for contact information related to the domain name and is referred to as a "thick" registry. For other TLDs, e.g. .com, .net, only the domain name and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, org and some other registries allows a customer to use an ICANN-accredited registrar. For example, if a customer, John Doe, wishes to register the domain name "JohnDoe.com", John Doe may initially determine whether the desired domain name is available by contacting a registrar. The customer may make this contact using the registrar's webpage and typing the desired domain name into a field on the registrar's webpage created for this purpose. Upon receiving the request from the customer, the registrar may ascertain whether "JohnDoe.com" has already been registered by checking the SRS database of the registry associated with the TLD of the domain name. The results of the search may then be displayed on the webpage to thereby notify the customer of the availability of the domain name. If the domain name is available, the customer may proceed with the registration process. Otherwise, the customer may keep selecting alternative domain names until an available domain name is found.

Domain names are typically registered for a period of one to ten years. If the registrant does not renew the domain name, it will expire. Shortly after the domain name goes past its expiration date the domain name will be deactivated. All domain services including the web page and email will no longer work. For approximately 40 days the domain name will be in a "grace period". During this time the domain name will not be active and may be renewed without paying any additional fees. At the end of the grace period the domain name will enter a 30-day redemption period. WHOIS information (name, address, telephone numbers, etc.) will be deleted from the registry. The domain may be renewed by its original owner for a fee during the redemption period. Five days after the end of the redemption period the domain name will be deleted from the registry and will be made available for anyone to register.

After the customer registers a domain name she may create a website. In the mean time a temporary page may be associated with the domain name. A temporary page may state "under construction," "coming soon," "this domain was registered," "for sale," etc. Often the registrar will provide this temporary page for the customer. The registrar may place an advertisement on the temporary page. Often the temporary webpages without substantive content are referred to as parked webpages, meaning the domain name is parked and awaiting further action (e.g. creating a website). FIG. 2 demonstrates a webpage snapshot from the GO DADDY website showing variations of parked webpages available from this registrar.

Some users may use a web browser to check if a domain name is taken. The user may type the domain name into the address field of the browser to see if a webpage comes in. If the webpage comes in, it means that the domain is taken, if the webpage does not come in, it may mean (but not guarantied) that the domain name is available.

After the website is up and running, the owner of the website may place an advertisement on the website. The website owner may search for advertisers or participate in one of the programs which combines a large number of advertisers and provides ads for the websites. An example of such a program is Google AdSense. Often online ads are selected to match the content of the webpage. These are so called targeted, relevant, contextual, or customized ads.

Additionally targeted ads may be associated with email messages. Targeted ads may be included into the body of an email message or may be displayed on the side of the email when the message is viewed online through a web browser.

Click through rate (CTR) is a ratio between the number of times the ad was clicked by the users and the number of times the ad was shown to the users. Generally, CTRs are low and often are around 1%. The CTRs of the targeted ads for the domain name registrars and domain name resellers are low as well. Therefore, new systems and methods are needed to improve CTRs for domain name registrars and domain name resellers.

SUMMARY OF THE INVENTION

The limitations cited above and others are substantially overcome through the systems and methods disclosed herein. The systems and methods of the present invention allow for domain name registrars and domain name resellers (domain name advertisers) to provide ads relevant to some characteristics of the email message, e.g. the content of the email message.

A sample embodiment of the invention discloses a system comprising an email message, an advertisement associated with the email message, and a domain name module. The domain name module may generate suggested domain names to be shown on the advertisement based on the properties of the email message and/or the properties of a network connection utilized to view the email message (collectively, email properties).

The system may further comprise a sender, a receiver, and a domain name advertiser. The sender may send the email message to the receiver. The receiver may view the email message via presenting means, such as email software or a webmail webpage. The domain name advertiser is typically a domain name registrar or a reseller who maintains (operates) the domain name module.

The domain name module may further comprise a domain name generator and a domain name database. The domain name generator may generate the suggested domain names based on the email properties. Typically, the domain name generator will identify terms in the email message and provide the suggested domain names. The domain name database may store active, expired, "on hold," and/or available for sale domain names. The data in the domain name database may be used to improve the quality of the suggested domain names.

A sample method of the invention comprises the steps of sending the email message, placing the advertisement within the email message or on the presenting means in proximity to the email message. Placing the advertisement on the webpage may further include analyzing the email properties, generating the suggested domain names, and displaying the suggested domain names on the advertisement.

The suggested domain names may be geared toward (customized for) the sender, the receiver, a third party.

The systems and methods of the present invention will help domain name advertisers in registering, selling, and backordering domain names.

The above features and advantages of the present invention will be better understood from the following detailed description taken in conjunction with the accompanying drawings.

BRIEF DESCRIPTION OF THE DRAWINGS

FIG. 1 (Prior Art) shows a List of current Generic Top-Level Domains.

FIG. 2 (Prior Art) is a snapshot of a webpage showing samples of parked webpages available from a registrar.

DETAILED DESCRIPTION AND PREFERRED EMBODIMENT

Figure 3:
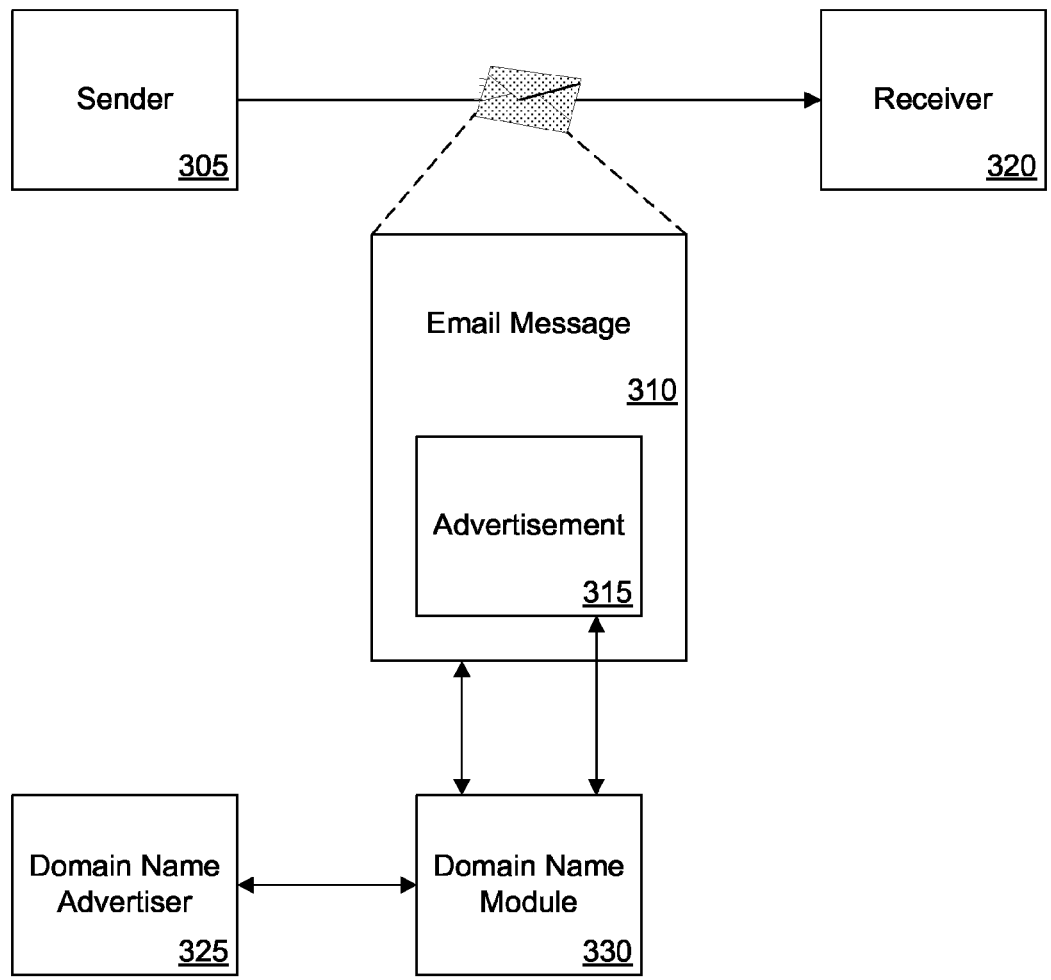
FIG. 3 is a block diagram illustrating a sample embodiment of the system of the present invention.

The present invention will now be discussed in detail with regard to the attached drawing figures which were briefly described above. In the following description, numerous specific details are set forth illustrating the Applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

For the purposes of this application a domain name advertiser means a domain name registrar, or a domain name registry, or a domain name reseller; or a partner, an affiliate, or an associate thereof; or any other party involved in registering, selling, reselling, backordering, or advertising domain names.

Referring to FIG. 3, a sender 305 may send an email message 310 to a receiver 320. The receiver 320 may view the email message 310 via a presenting means, such as email software or a webmail webpage. A domain name advertiser 325 may place an advertisement 315 in the email message 310 or on the presenting means in proximity to the email message 310. Placing the advertisement 315 on the presenting means in proximity to the email message 310 means that the presenting means and the advertisement 315 may be viewed simultaneously. The advertisement 315 displays one or more domain names (hereinafter, suggested domain names). The suggested domain names are generated by a domain name module 330 based on the properties of the email message and/or the properties of a network connection utilized to view the email message (collectively, email properties).

Figure 8:
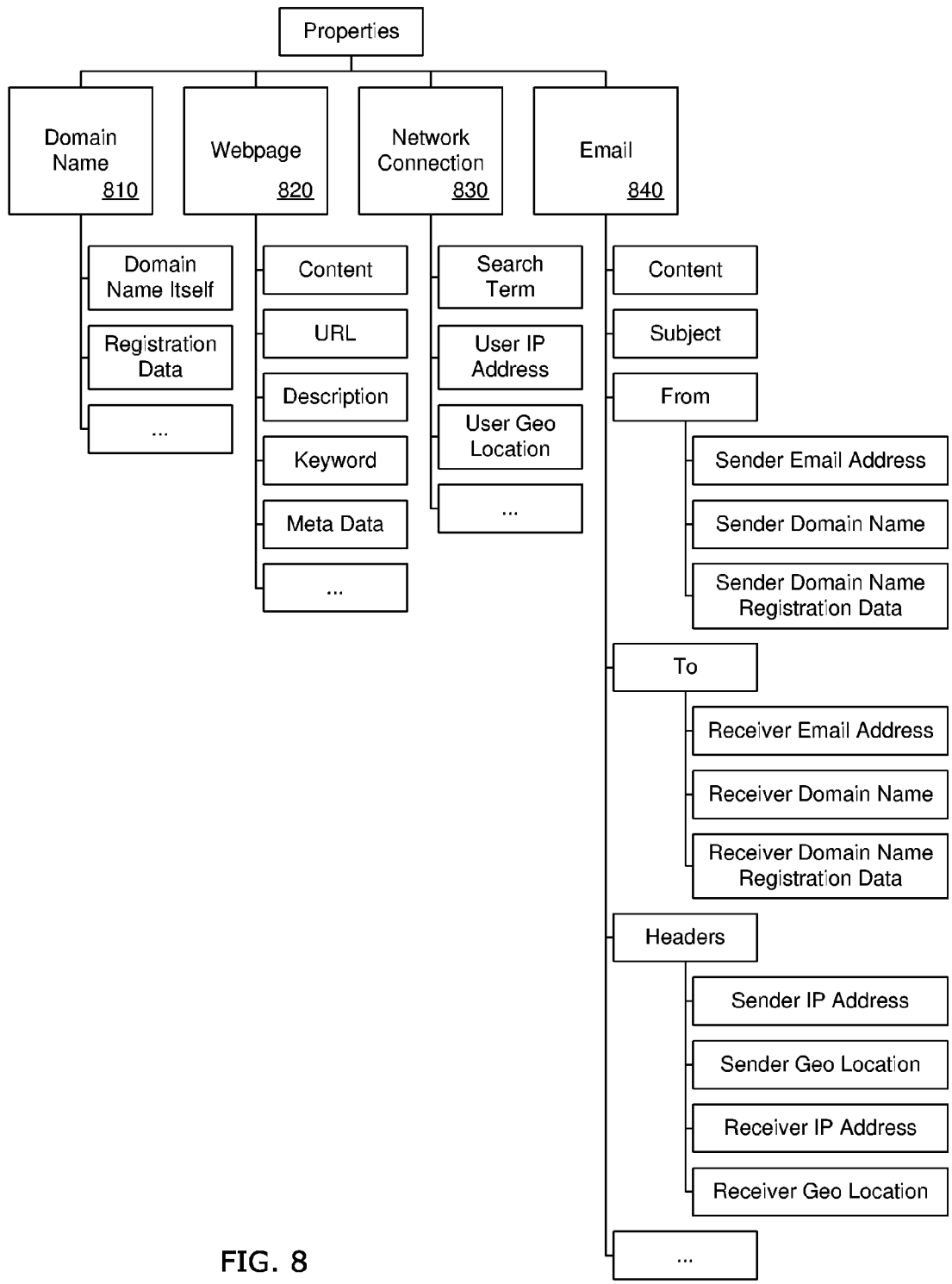
FIG. 8 illustrates various properties that may be utilized to generate suggested domain names.

FIG. 8 shows sample properties of an email message 840 and a network connection 830. The properties of the email message may include content of the message, a subject, from and to fields, sender's and receiver's email addresses, sender's and receiver's domain names, sender's and receiver's domain names registration data (also known as WHOIS records), headers of the message, sender's and receiver's network addresses (e.g. IP addresses), sender's and receiver's geographical locations, etc. Sender's and receiver's domain names may be determined from sender's and receiver's email addresses respectfully. Sender's and receiver's network addresses may be determined from the email headers. Sender's and receiver's geographical locations may be approximated from the sender's and receiver's IP addresses.

For example, if the email message was sent from john@greencelery.com, the suggested domain names may be greencelery.us, green-celery.com, eatcelery.net, johnscelery.com, etc. If the registration data of the sender's domain name shows that the domain name was registered to XYZ Co-op in Phoenix, Ariz., the suggested domain names may be xyz-coop.com, xyz-coop.biz, celeryfromcoop.net, az-celery.us, johninphoenix.com, az-john.name, etc.

The properties of the network connection may include sender's and receiver's network addresses (e.g. IP addresses), sender's and receiver's geographical locations, etc. Sender's and receiver's geographical locations may be approximated from the IP addresses. For example, if the sender's IP address indicates a location in Phoenix, Ariz. and the receiver's IP address indicates a location in San Diego, Calif., the suggested domain names may be PhoenixSanDiego.com, az-cabridge.net, etc.

Referring to FIG. 3, the sender 305 or the receiver 320 or a third party (collectively, a user) may view the email message 310 via the presenting means. The domain name module 330 may display the advertisement 315 with the suggested domain names on the webpage 310. The domain name module 330 is a technological means for generating (producing) the suggested domain names and may be operated by the domain name advertiser 325. The domain name module 330 may embed the advertisement 315 into the email message 310 on a sender's client level, on a receiver's client level, or while the email message 310 is being transmitted. The domain name module 330 may provide the suggested domain names for the advertisement 315 dynamically (e.g. generate the suggested domain names each time the user views the email message 310) or may cache the suggested domain names in a computer memory for some period of time. The advertisement 315 may be in various digital formats, such as HTML, java script, visual basic script, java applet, flash object, graphics, etc.

In some instances, while viewing the webpage 310, the publisher 305 may assume a role of the user 320. Considering that, the suggested domain names may be geared toward (customized for) the sender 305, the receiver 320, or a third party. The suggested domain names for the sender 305 may use the email properties related to the sender 305 (e.g. sender's email address, sender's domain name, sender's geographical location, etc.) and the suggested domain names for the receiver 320 may use the email properties related to the receiver 320 (e.g. receiver's email address, receiver's domain name, receiver's geographical location, etc.). The domain name module 330 may determine a mailbox the email message 310 is appearing in. The mailbox may be determined, for example, from a URL of the webmail webpage. The URL http://mail.greencelery.com:90/inbox may indicate that the user is looking at the Inbox. If the email message 310 is appearing in the Inbox, it is likely to be viewed by the receiver 320; if the email message 310 is appearing in the Sent Items mailbox, it is likely to be viewed by the sender 305. Further, the domain name module 330 may obtain the network address (e.g. IP address) of the user viewing the email message 310 and determine if it's likely to be the sender 305 or the receiver 320.

While generating the suggested domain names, the domain name module 330 may determine various terms from the email properties, concatenate the terms, provide alternative spellings of the terms, provide alternative terms that are similar in meaning to the terms, provide synonyms, provide related terms, change between single and plural forms of the terms, append prefixes and suffixes to the terms, add additional characters to the terms (e.g. dash), rearrange the terms, append additional words to the terms, add domain name suffixes to the terms (e.g. .com, .net, org, .us, .co.uk, .go.com), etc. The domain name suffixes may be top level domain name (TLD) extensions (e.g. .com, .net, .org, .us, etc.) or subdomains of any level (e.g. .co.uk, .go.com, subdomain2.subdomainl.com, etc.).

Figure 4:
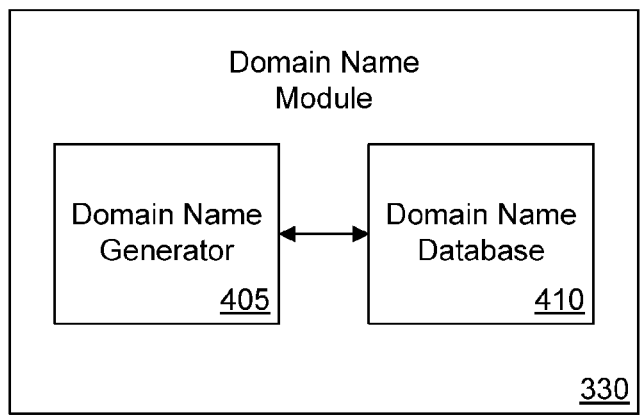
FIG. 4 is a block diagram illustrating a sample embodiment of the domain name module illustrated in FIG. 3.

Referring to FIG. 4, the domain name module 330 may comprise a domain name generator 405 and a domain name database 410. The domain name generator 405 may generate the domain names based on the terms determined from the email properties. The domain name database 410 may store active (previously registered and currently not expired) domain names. Since active domain names are not available for registration, the domain name generator 405 may filter out the active domain names.

Alternatively or additionally the domain name database 410 may store expired (previously registered and currently expired) domain names. Thus, the domain name generator 405 may find in the domain name database 410 the expired domain names that contain one or more terms determined from the email properties. Also parts, variations, synonyms, antonyms, alternatives, equivalents, foreign language translations of the terms, or related terms may be used to find the expired domain names in the domain name database 410. The expired domain names may be more appealing to the user than other domain names.

Alternatively or additionally the domain name database 410 may store registered domain names available for sale through a secondary market (offer/acceptance, auction, etc.). Thus, the domain name generator 405 may find in the domain name database 410 registered domain names available for sale through a secondary market that contain one or more terms determined from the email properties. Also parts, variations, synonyms, antonyms, alternatives, equivalents, foreign language translations of the terms, or related terms may be used to find the registered domain names available for sale through a secondary market in the domain name database 410. The registered domain names available for sale through a secondary market may be more appealing to the user than other domain names.

If the domain name is already registered and is not available for sale, the user may backorder it (i.e. buy it when it becomes available) or make an offer to purchase it from the current owner.

Further, the domain name database 410 may store domain names which are in "on hold" status by the registry (typically during the grace period or redemption period). The user may be offered to backorder domain names with "on hold" status.

Figure 9:
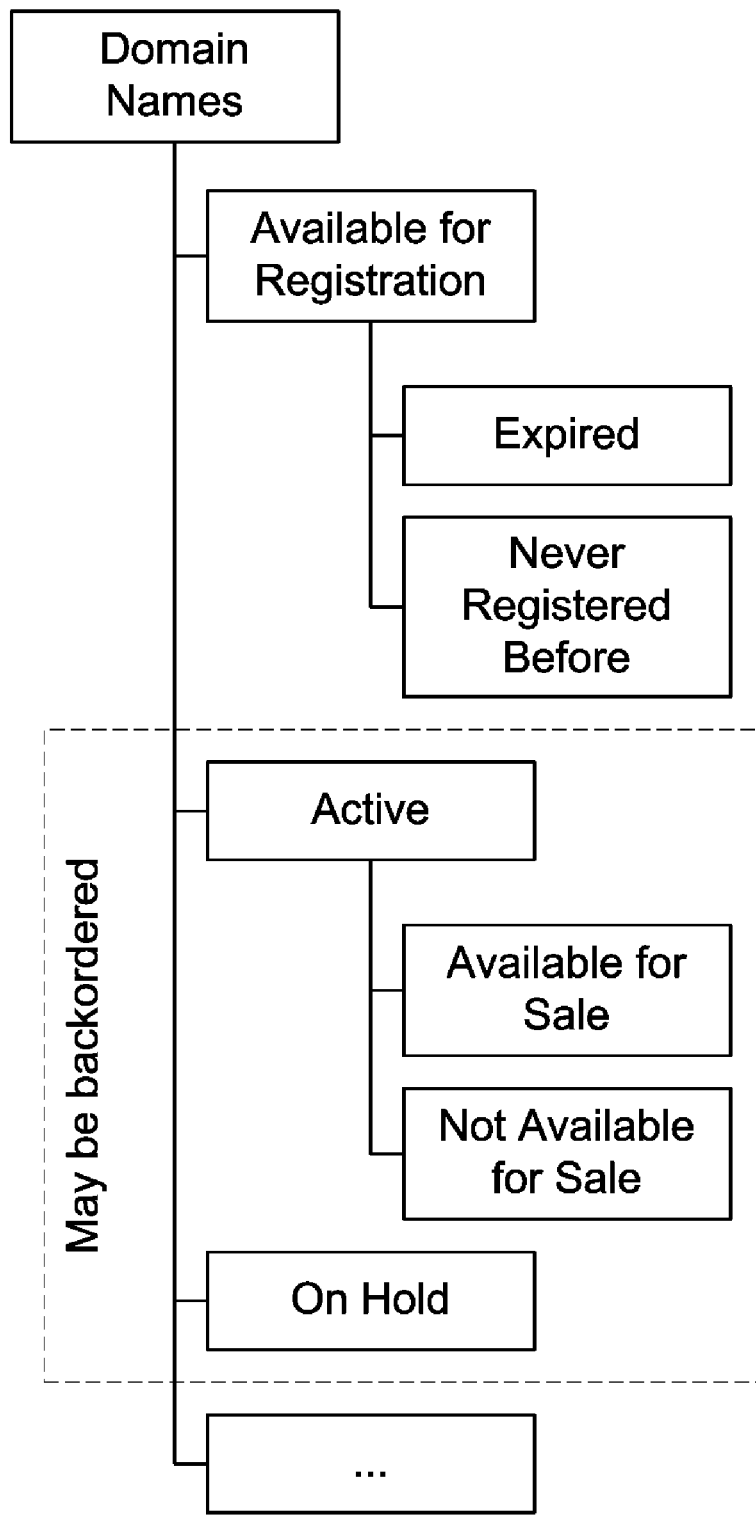
FIG. 9 illustrates a sample classification of domain names.

FIG. 9 provides a sample classification of the domain names that may help to understand the differences between the classes of the domain names described above.

The suggested domain names may appear in the email message 310 or on the presenting means as links to the website(s) where the domain names may be obtained. Such websites may include domain name registrars, domain names sellers, websites that sell domain names through a secondary market (e.g. domain name auction sites), etc. Additionally, the suggested domain names may be accompanied by checkboxes. The user may select one or more checkboxes and then register/buy selected domain names as a group or obtain additional information on those names (e.g. prices or availability).

The domain name may or may not be necessarily available for registration or sale. Availability of the domain name may be further determined if the user expresses an interest in the domain name and clicks on the provided link or selects a checkbox. The user may backorder an active domain name or make an offer to purchase it. Further, the user may be provided with the option of selecting the types of domain names that are of interest to the user (e.g. show only domain names available for registration). Such options may be saved for each user on the client side in the computer's "cookie" files or on the server side in a database, wherein individual options may be associated with each user's network address.

Figure 5:
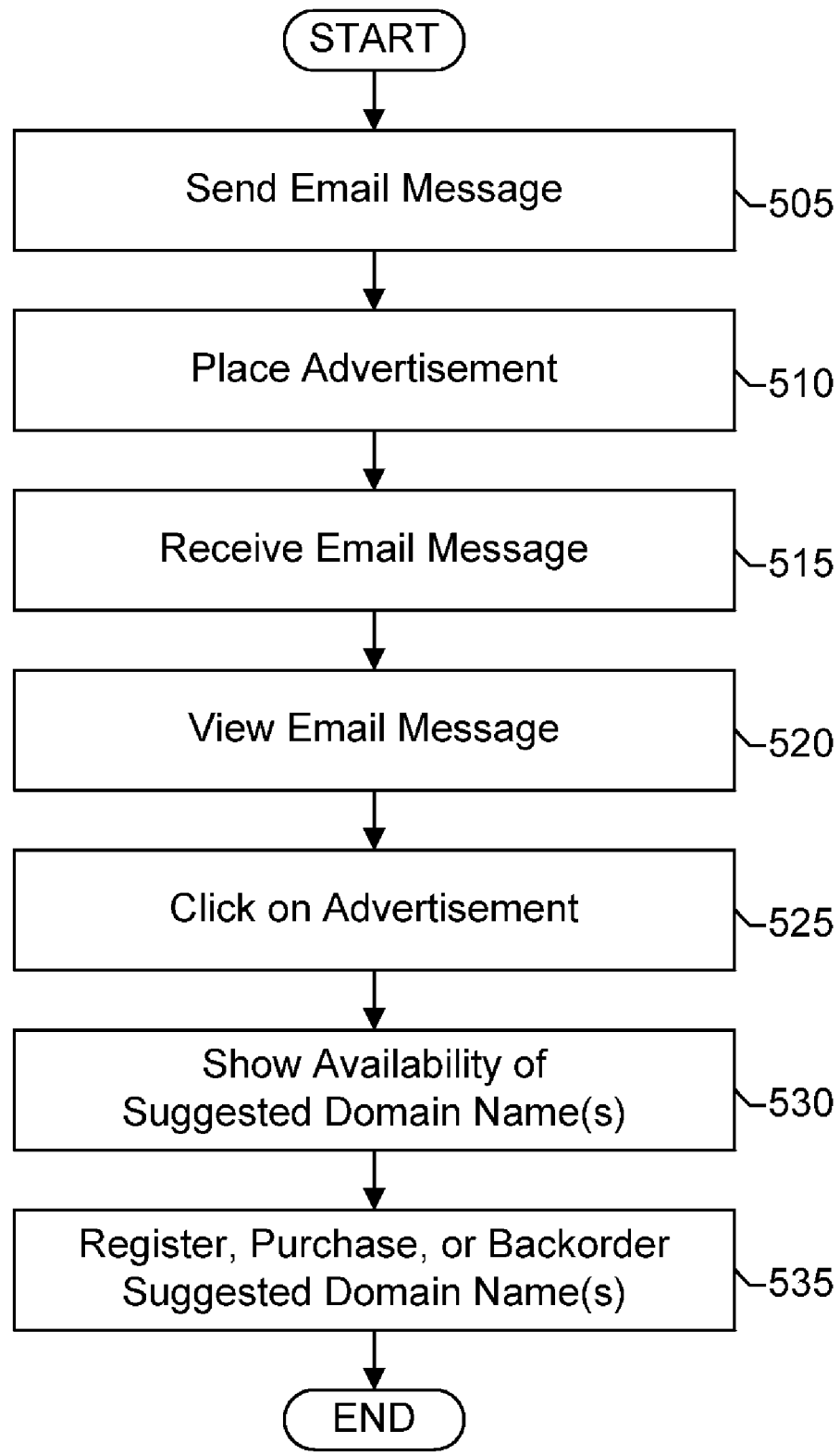
FIGS. 5-7 are flowcharts illustrating various embodiments of the method(s) of the present invention.

Referring to FIG. 5, a sender may send an email message (Step 505). The sender or a domain name advertiser may place an advertisement in the email message or on presenting means in proximity to the email message (Step 510). The advertisement displays suggested domain name(s) based on the properties of the email message and/or the properties of a network connection utilized to view the email message (collectively, properties). A receiver may receive the email message (Step 515). A user (the sender, the receiver, or a third party) may view the email message via the presenting means (Step 520). The user may then click on the advertisement or on one of the suggested domain names (Step 525). A webpage may be opened showing availability of the selected suggested domain name(s) for registration, sale, or backorder (Step 530). The user may register, purchase, or backorder selected suggested domain name(s) (Step 535).

"Click on the advertisement or on one of the suggested domain names" in Step 525 means that the user may follow the link embedded in the advertisement or execute the logic embedded in the advertisement (e.g. Java Script). Alternatively or additionally, suggested domain names may be accompanied by checkboxes and the user may select one or more of them.

Figure 6:
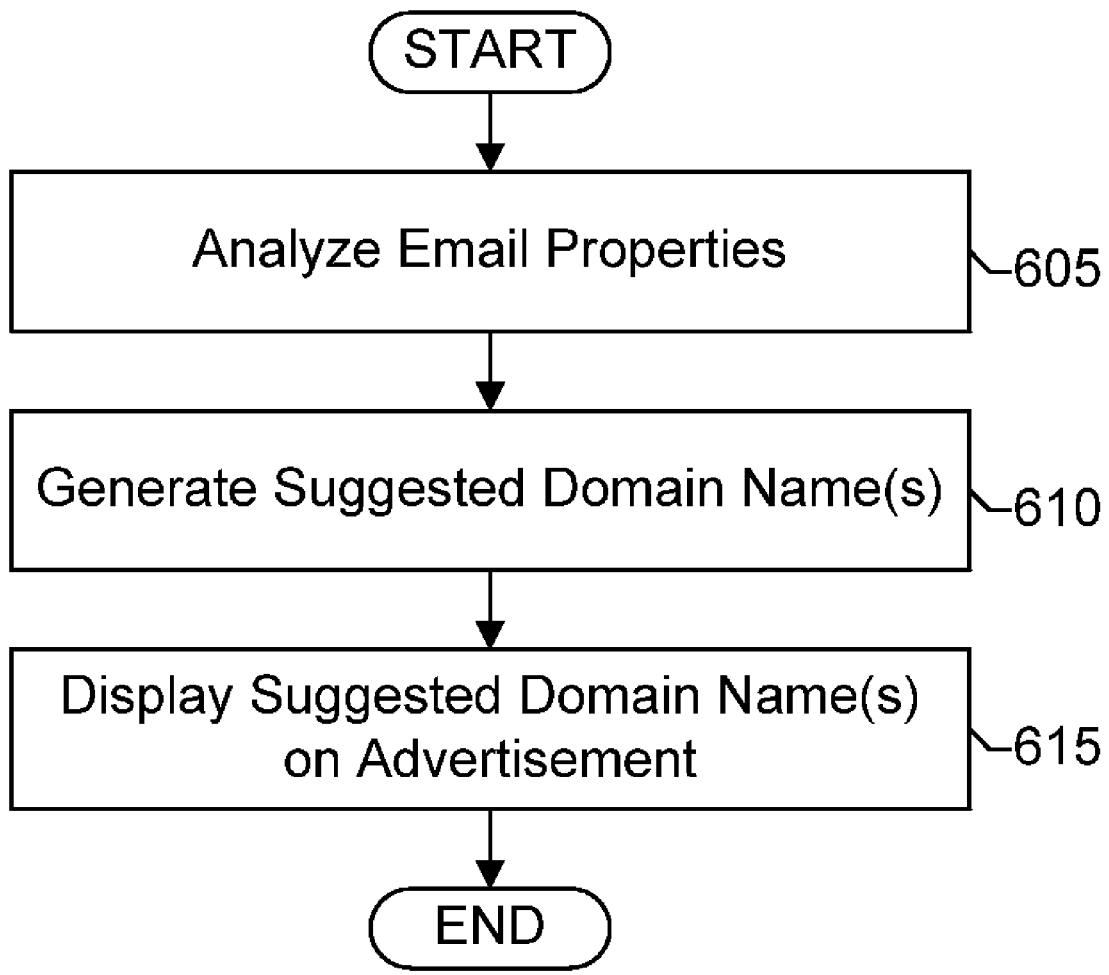

Referring to FIG. 6, placing the advertisement in the email message or on the presenting means may further encompass analyzing the email properties (Step 605). The domain name module may generate the suggested domain names (Step 610) and display them on the advertisement (Step 615).

The following example demonstrates how the suggested domain names may be generated. An email message may be sent from email address john@greencelery.com to sally@germanshepherds.com. The domain name germanshepherds.com may be registered to "The Dog Lover's Club" in Little Rock, Ark. The email subject may be "IVDD". The content of the email message may describe the Intervertebral Disc Disease in dogs. The IP of the sender's computer may indicate that it's located in San Diego, Calif.

Figure 7:
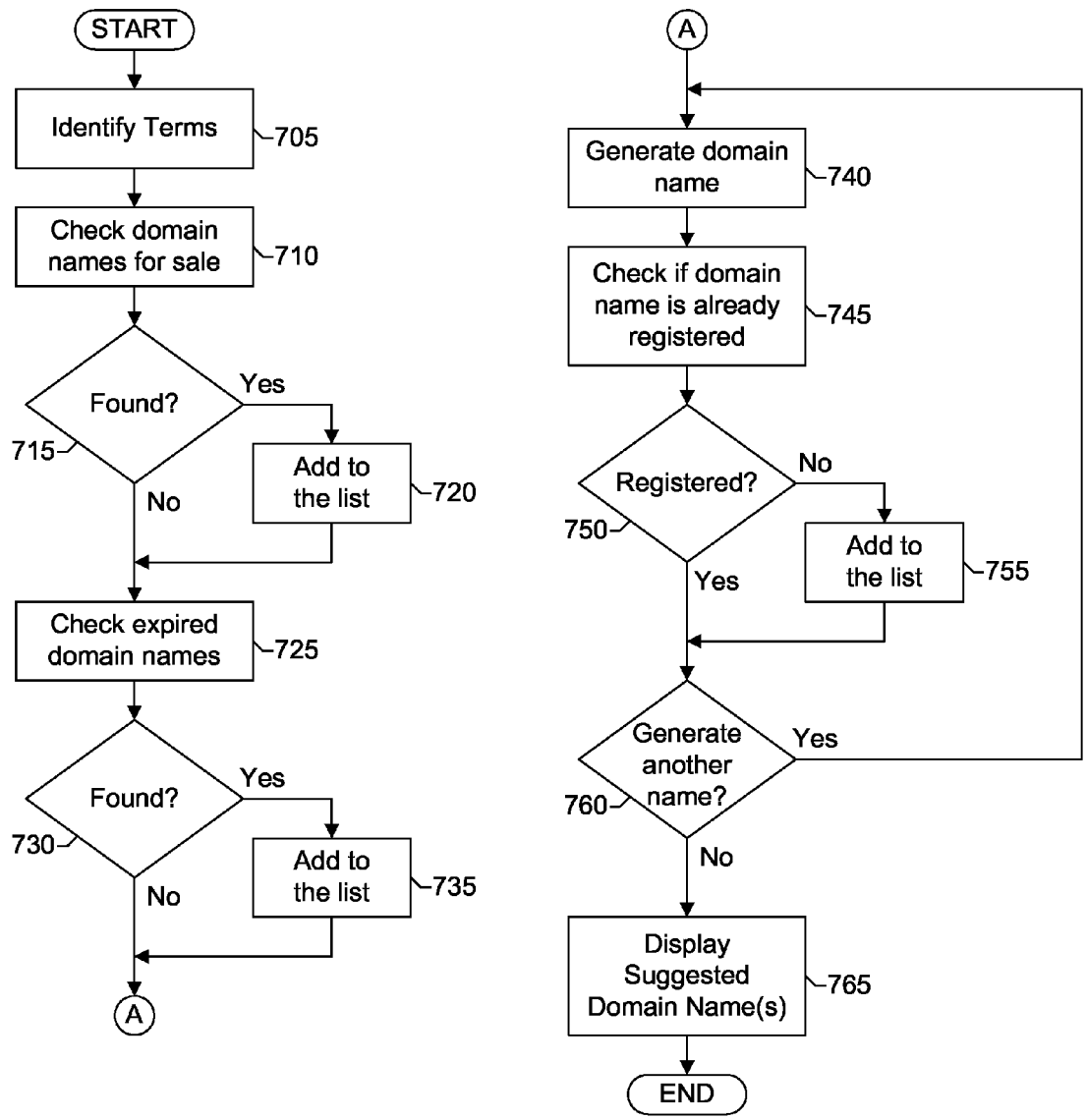

Referring to FIG. 7, a domain name module may identify terms "John", "green", "celery", "sally", "German", "shepherds", "dog", "lover", "club", "Little Rock", "Arkansas", "IVDD", "spinal disk", "San Diego", "California", etc. from the email properties (Step 705). The domain name module may check if there are any domain names available for sale, which contain such terms (or their parts, variations, synonyms, antonyms, alternatives, equivalents, foreign language translations, or related terms) (Step 710). If the domain names available for sale containing the terms are found (Step 715), they may be added to a list of suggested domain names that will be displayed on an advertisement (Step 720). Then, the domain name module may check if any expired domain names containing the terms (or their parts, variations, synonyms, antonyms, alternatives, equivalents, foreign language translations, or related terms) are available for registration (Step 725). If the expired domain names available for registration containing the terms are found (Step 730), they may be added to the list (Step 735).

Further, the domain name module may generate a domain name based on the terms (e.g. german-shepherds.com, germanshepherd.us, 123germanshepherd.net, shepherdsgerman.org, shepherdclub.org, Little-Rock-shepherds.biz, johnsshepherds.org, caninevet.cc, california-shepherds.com, sallylovesdogs.net, dogs-dont-eat-celery.ws, etc.) (Step 740). The domain name module may check if the domain name is already registered (Step 745). If the domain name is not registered (Step 750), it may be added to the list (Step 755). If more domain names are desired (Step 760), the process may be repeated starting at Step 740. Finally, the domain name module may display the list of suggested domain names on the advertisement (Step 765).

Additionally, the domain names on the list may be prioritized. Domain names that are shorter in length, lacking dashes, lacking numeric characters, available for registration, containing exact terms as they were determined from the email properties, etc. may have a higher priority than other domain names. Further, the domain names on the list may be sorted in order of priority. If the quantity of the domain names on the list is more than a desired number, only top results may be shown on the advertisement.

Some steps described above and illustrated in FIGS. 5-7 may be performed simultaneously or in a different order. For example, referring to FIG. 5, Step 510 (placing the advertisement) may be performed after Step 515 (receiving the email message) or simultaneously with Step 520 (viewing the email message). Also the various steps described above may be performed by various machines and apparatuses; and not necessarily by those described or mentioned above.

U.S. patent application Ser. No. 10/906,250 entitled "Search Engine and Domain Name Search Integration" filed on Feb. 10, 2005 is hereby incorporated in its entirety by reference.

U.S. Patent Application Publication No. 2003/0050863 A1 entitled "Targeted advertisements using time-dependent key search terms" published on Mar. 13, 2003 is hereby incorporated in its entirety by reference.

U.S. Patent Application Publication No. 2004/0059708 A1 entitled "Methods and apparatus for serving relevant advertisements" published on Mar. 25, 2004 is hereby incorporated in its entirety by reference.

U.S. Patent Application Publication No. 2004/0059712 A1 entitled "Serving advertisements using information associated with e-mail" published on Mar. 25, 2004 is hereby incorporated in its entirety by reference.

U.S. Patent Application Publication No. 2004/0093327 A1 entitled "Serving advertisements based on content" published on May 13, 2004 is hereby incorporated in its entirety by reference.

U.S. Patent Application Publication No. 2004/0167928 A1 entitled "Serving content-relevant advertisements with client-side device support" published on Aug. 26, 2004 is hereby incorporated in its entirety by reference.

U.S. Patent Application Publication No. 2004/0267725 A1 entitled "Serving advertisements using a search of advertiser Web information" published on Dec. 30, 2004 is hereby incorporated in its entirety by reference.

U.S. Patent Application Publication No. 2005/0021397 A1 entitled "Content-targeted advertising using collected user behavior data" published on Jan. 27, 2005 is hereby incorporated in its entirety by reference.

U.S. Pat. No. 6,298,341 entitled "System and method for generating domain names and for facilitating registration and transfer of the same" issued on Oct. 2, 2001 is hereby incorporated in its entirety by reference.

U.S. Pat. No. 6,519,589 entitled "System and method for generating domain names and for facilitating registration and transfer of the same" issued on Feb. 11, 2003 is hereby incorporated in its entirety by reference.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The elements described in this specification in plural form may also be construed as singular, unless specifically stated otherwise. The elements described in this specification in singular form may also be construed as plural, unless specifically stated otherwise.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

What is claimed is:

1. A method, comprising the steps of:
receiving, by a device, an email message from a sender, wherein said email message is addressed to a receiver,
extracting, by said device, a registered original domain name from said email message, analyzing, by said device, registration information of said registered original domain name,
generating, by said device, one or more suggested domain names based on said registration information of said registered original domain name, wherein said one or more suggested domain names differ from said registered original domain name, thus providing one or more alternative domain names to said registered original domain name, and
displaying, by said device, one or more links to said one or more suggested domain names within an email message or in proximity to said email message, wherein said one or more links reference a webpage configured for registration, purchase, or backorder of said one or more suggested domain names.

2. The method of claim 1, further comprising a step of:
transferring said email message from a sender's computer to a receiver's computer.

3. The method of claim 1, further comprising a step of:
registering said one or more suggested domain names.

4. The method of claim 1, further comprising a step of:
purchasing said one or more suggested domain names.

5. The method of claim 1, further comprising a step of:
backordering said one or more suggested domain names.

6. A method, comprising the steps of:
receiving, by a device, an email message from a sender, wherein said email message is addressed to a receiver,
extracting, by said device, a registered original domain name from a sender's email address, analyzing, by said device, registration information of said registered original domain name,
generating, by said device, one or more suggested domain names based on said registration information of said registered original domain name, wherein said one or more suggested domain names differ from said registered original domain name, thus providing one or more alternative domain names to said registered original domain name, and
displaying, by said device, one or more links to said one or more suggested domain names within an email message or in proximity to said email message, wherein said one or more links reference a webpage configured for registration, purchase, or backorder of said one or more suggested domain names.

7. A method, comprising the steps of:
receiving, by a device, an email message from a sender, wherein said email message is addressed to a receiver,
extracting, by said device, a registered original domain name from a receiver's email address,
analyzing, by said device, registration information of said registered original domain name, generating, by said device, one or more suggested domain names based on said registration information of said registered original domain name, wherein said one or more suggested domain names differ from said registered original domain name, thus providing one or more alternative domain names to said registered original domain name, and
displaying, by said device, one or more links to said one or more suggested domain names within an email message or in proximity to said email message, wherein said one or more links reference a webpage configured for registration, purchase, or backorder of said one or more suggested domain names.

* * * * *